US012555052B2

(12) United States Patent
Chen et al.

(10) Patent No.: US 12,555,052 B2
(45) Date of Patent: Feb. 17, 2026

(54) SYSTEM FOR VEHICLE OPERATOR WORKLOAD ASSESSMENT AND ANNUNCIATION

(71) Applicant: Honeywell International Inc., Charlotte, NC (US)

(72) Inventors: Shuai Chen, Shanghai (CN); Alan Bruce Hickman, Phoenix, AZ (US); Lili Ji, Shanghai (CN); Zhilian Hao, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 23 days.

(21) Appl. No.: 17/579,070

(22) Filed: Jan. 19, 2022

(65) Prior Publication Data
US 2023/0229992 A1    Jul. 20, 2023

(51) Int. Cl.
*G06Q 10/0631* (2023.01)
*G06Q 10/0639* (2023.01)
(Continued)

(52) U.S. Cl.
CPC ......... *G06Q 10/063116* (2013.01); *G06Q 10/06315* (2013.01); *G06Q 10/06398* (2013.01); *G07C 5/008* (2013.01); *G07C 5/0808* (2013.01)

(58) Field of Classification Search
None
See application file for complete search history.

(56) References Cited

U.S. PATENT DOCUMENTS 5,075,881 A * 12/1991 Blomberg .............. G09B 23/00
703/2
8,766,819 B2    7/2014 Dorfmann et al.
(Continued)

FOREIGN PATENT DOCUMENTS

| CN | 111767611 A | 10/2020 |
| EP | 2437033 A2 | 4/2012 |
| EP | 3667645 A1 | 6/2020 |

OTHER PUBLICATIONS

Van Drongelen, A., Boot, C.R.L., Hlobil, H. et al. Risk factors for fatigue among airline pilots. Int Arch Occup Environ Health 90, 39-47 (2017) (Year: 2017).*

(Continued)

*Primary Examiner* — Darlene Garcia-Guerra
(74) *Attorney, Agent, or Firm* — Shumaker & Sieffert, P.A.

(57) ABSTRACT

A system to assess the current, or future workload of a pilot and automatically providing annunciation when needed to the pilot, as well as to resources that support the pilot. The system may automatically, and without pilot involvement, assess the workload for the pilot based on incoming events and abnormal scenarios. The predicted incoming events may be related to operation data, such as navigation information, weather, traffic avoidance, and so on. The system may also detect abnormal scenarios, such as engine warnings, fuel or other aircraft issues. The system may determine whether the predicted incoming events or the abnormal scenario satisfies one or more pre-defined criteria. Based on the event satisfying one or more criteria, the system may output an annunciation to either the pilot, resources that support the pilot, such as an additional pilot and air traffic control (ATC).

16 Claims, 3 Drawing Sheets

(51) Int. Cl.
 *G07C 5/00* (2006.01)
 *G07C 5/08* (2006.01)

(56) References Cited

U.S. PATENT DOCUMENTS

| | | | | |
|---|---|---|---|---|
| 8,892,274 | B2 | 11/2014 | Baudry | |
| 8,928,498 | B2* | 1/2015 | Dorneich | G06Q 10/06 |
| | | | | 340/963 |
| 10,293,830 | B2 | 5/2019 | Selvaraj et al. | |
| 10,952,668 | B2 | 3/2021 | Ruwe et al. | |
| 11,150,653 | B1* | 10/2021 | Fannin | B64D 45/00 |
| 11,657,721 | B1* | 5/2023 | Suiter | G08G 5/003 |
| | | | | 701/14 |
| 11,928,970 | B2* | 3/2024 | Schwindt | G06Q 10/06311 |
| 2012/0075123 | A1* | 3/2012 | Keinrath | G08G 5/0052 |
| | | | | 340/963 |
| 2012/0075124 | A1* | 3/2012 | Whitlow | G08G 5/21 |
| | | | | 340/971 |
| 2012/0078445 | A1* | 3/2012 | Krupansky | G01C 23/00 |
| | | | | 701/3 |
| 2012/0319869 | A1 | 12/2012 | Dorfmann et al. | |
| 2013/0124076 | A1* | 5/2013 | Bruni | G08G 5/76 |
| | | | | 701/120 |
| 2013/0135109 | A1* | 5/2013 | Sharon | G08B 21/06 |
| | | | | 340/576 |
| 2015/0123820 | A1* | 5/2015 | Merle | A61B 5/18 |
| | | | | 340/945 |
| 2019/0090800 | A1* | 3/2019 | Bosworth | A61B 5/0015 |
| 2019/0127080 | A1* | 5/2019 | Selvarajan | B64D 45/00 |
| 2019/0389565 | A1* | 12/2019 | Lissajoux | B64D 45/00 |
| 2020/0184725 | A1* | 6/2020 | Venugopalan | G06T 19/006 |
| 2020/0184833 | A1* | 6/2020 | Schwindt | G08G 5/0021 |
| 2020/0258405 | A1* | 8/2020 | Fern | G08G 5/22 |
| 2020/0261017 | A1* | 8/2020 | Ruwe | A61B 5/18 |
| 2020/0290740 | A1* | 9/2020 | Rangan | A61B 5/18 |
| 2021/0034053 | A1* | 2/2021 | Nikolic | G08G 5/025 |
| 2021/0094700 | A1* | 4/2021 | Bergeron | B64D 45/00 |
| 2021/0241654 | A1* | 8/2021 | Onur | G09B 19/165 |
| 2022/0063836 | A1* | 3/2022 | Walter | B64C 13/22 |
| 2022/0092991 | A1* | 3/2022 | Crain | G08G 5/045 |
| 2023/0046264 | A1* | 2/2023 | Zhang | G08G 5/21 |

OTHER PUBLICATIONS

Casner, Stephen M. "Perceived vs. measured effects of advanced cockpit systems on pilot workload and error: Are pilots' beliefs misaligned with reality?." Applied ergonomics 40.3 (2009): 448-456 (Year: 2009).*

Gentili, Rodolphe J., et al. "Brain biomarkers based assessment of cognitive workload in pilots under various task demands." 2014 36th Annual International Conference of the IEEE Engineering in Medicine and Biology Society. IEEE, 2014 (Year: 2014).*

Trujillo, Anna C. "Pilot mental workload with predictive system status information." Proceedings Fourth Annual Symposium on Human Interaction with Complex Systems. IEEE, 1998 (Year: 1998).*

Feng, Chuanyan, et al. "A comprehensive prediction and evaluation method of pilot workload." Technology and health care 26.1_suppl (2018): 65-78 (Year: 2018).*

Vu, Kim-Phuong L., et al. "Pilot and controller workload and situation awareness with three traffic management concepts." 29th digital avionics systems conference. IEEE, 2010 (Year: 2010).*

Annex to the communication for counterpart European Application No. EP 22217427.8 (Retrieved from Global Dossier), dated Feb. 7, 2025 (Year: 2025).*

Extended Search Report from counterpart European Application No. 22217427.8 dated Jun. 22, 2023, 8 pp.

Response to Extended Search Report dated Jun. 22, 2023, from counterpart European Application No. 22217427.8 filed Jul. 31, 2023, 19 pp.

Communication pursuant to Article 94(3) EPC from counterpart European Application No. 22217427.8 dated Jul. 2, 2025, 8 pp.

Response to Communication pursuant to Article 94(3) EPC dated Jul. 2, 2025, from counterpart European Application No. 22217427.8 filed Oct. 14, 2025, 11 pp.

* cited by examiner

SYSTEM FOR VEHICLE OPERATOR WORKLOAD ASSESSMENT AND ANNUNCIATION

TECHNICAL FIELD

The disclosure relates to automated safety systems for vehicles.

BACKGROUND

Current transport airplane requires two pilots in cockpit and sometimes it requires more crew onboard during long route flight across ocean for rotation. Typically, the cockpit working pattern is that only one pilot actively flies the airplane, and the other pilot, or pilots, monitors the operation. One key risk in reduced crew, such as single pilot operation is the human factor. Though pilots are qualified in skills and knowledges, there are cases that they may not react properly especially under high workload. In some examples, a pilot may become overloaded and not notice some indications that the pilot should take an action. In other examples, some pilots may operate with one or more hazardous attitudes that may interfere with the ability to make sound decisions and act properly. The U.S. Federal Aviation Administration (FAA) in its Risk Management Handbook (FAA-H-8083-2) has identified some hazardous attitudes related to aeronautical decision-making (ADM), which may include anti-authority ("e.g., don't tell me"), invulnerability ("it won't happen to me") or macho ("I can do it").

SUMMARY

In general, the disclosure describes systems that may objectively assess the current, or future workload of a pilot and automatically providing annunciation when needed to the pilot, as well as to resources that support the pilot. The system may automatically, and without pilot involvement, assess the workload for the pilot based on current and future events and abnormal scenarios, using predefined criteria. The system may process the inputs from various onboard systems and sensors to predict incoming events. The predicted incoming events may be related to normal operation data, such as navigation information, weather, traffic avoidance, and so on. The system may also detect possible abnormal scenarios, such as engine warnings, fuel or other system issues, and so on. The system may determine whether the predicted incoming events or the abnormal scenario satisfies one or more criteria. Based on the event satisfying one or more criteria, the system may output an annunciation to either the pilot, resources that support the pilot, or both. For example, the system may detect impending weather that may require both pilots be managing the flight of the aircraft. The system may notify the pilot of the aircraft, as well as an onboard off-duty pilot that the off-duty pilot should return to the flight deck. In other examples, the system may also notify air traffic control (ATC), based on the workload assessment from the sensed data satisfying specified criteria. The system may perform the functions described above for both manned aircraft with an onboard flight crew, as well as for a remote pilot of an unmanned aerial vehicle (UAV). Such a workload assessment and warning system may also be valuable for other types of vehicles, including for vehicle operators for trains, automobiles, boats, ships and other types of vehicles. To simplify the description, the system of this disclosure may be described in terms of aviation, e.g., manned and unmanned aircraft, but the system should not be limited only to aircraft.

In one example, this disclosure describes a system for assessing a pilot workload for an aircraft comprising a memory; and processing circuitry operatively coupled to the memory and configured to: receive information regarding operational data related to a flight of the aircraft; determine the pilot workload based on the received information; compare the determined pilot workload to a set of criteria; determine which request of a set of requests to output based on the comparison, wherein the set of requests includes: a preventive reminding request; a mandatory cooperation request; and an external awareness request; select a notification message based on: the determined request of the set of requests and the determined workload, wherein the notification message includes a notification message channel; and cause the notification message channel to output the notification message.

In another example, this disclosure describes a non-transitory computer-readable storage medium storing instructions that, when executed, cause one or more processors of a computing device to: determine a pilot workload of an aircraft pilot, wherein to determine the pilot workload, the instructions cause the one or more processors to: receive information regarding operational data related to a flight of the aircraft; determine pilot workload based on the received information; compare the determined pilot workload to a set of criteria; determine which request of a set of requests to output based on the comparison to the set of criteria, wherein the set of requests includes: a preventive reminding request; a mandatory cooperation request; and an external awareness request; select a notification message based on: the determined request of the set of requests and the determined workload, wherein the notification message includes a notification message channel; and cause the notification message channel to output the notification message.

In another example, this disclosure describes a method for assessing aircraft pilot workload comprising receiving, by processing circuitry operatively coupled to a memory, information regarding operational data related to a flight of an aircraft operated by the pilot; determining, by the processing circuitry, the pilot workload based on the received information; comparing the determined pilot workload to a set of criteria; determining which request of a set of requests to output based on the comparison to the set of criteria, wherein the set of requests includes: a preventive reminding request; a mandatory cooperation request; and an external awareness request; selecting a notification message based on: the determined request of the set of requests and the determined workload, wherein the notification message includes a notification message channel; and causing the notification message channel to output the notification message.

DETAILED DESCRIPTION

Figure 1:
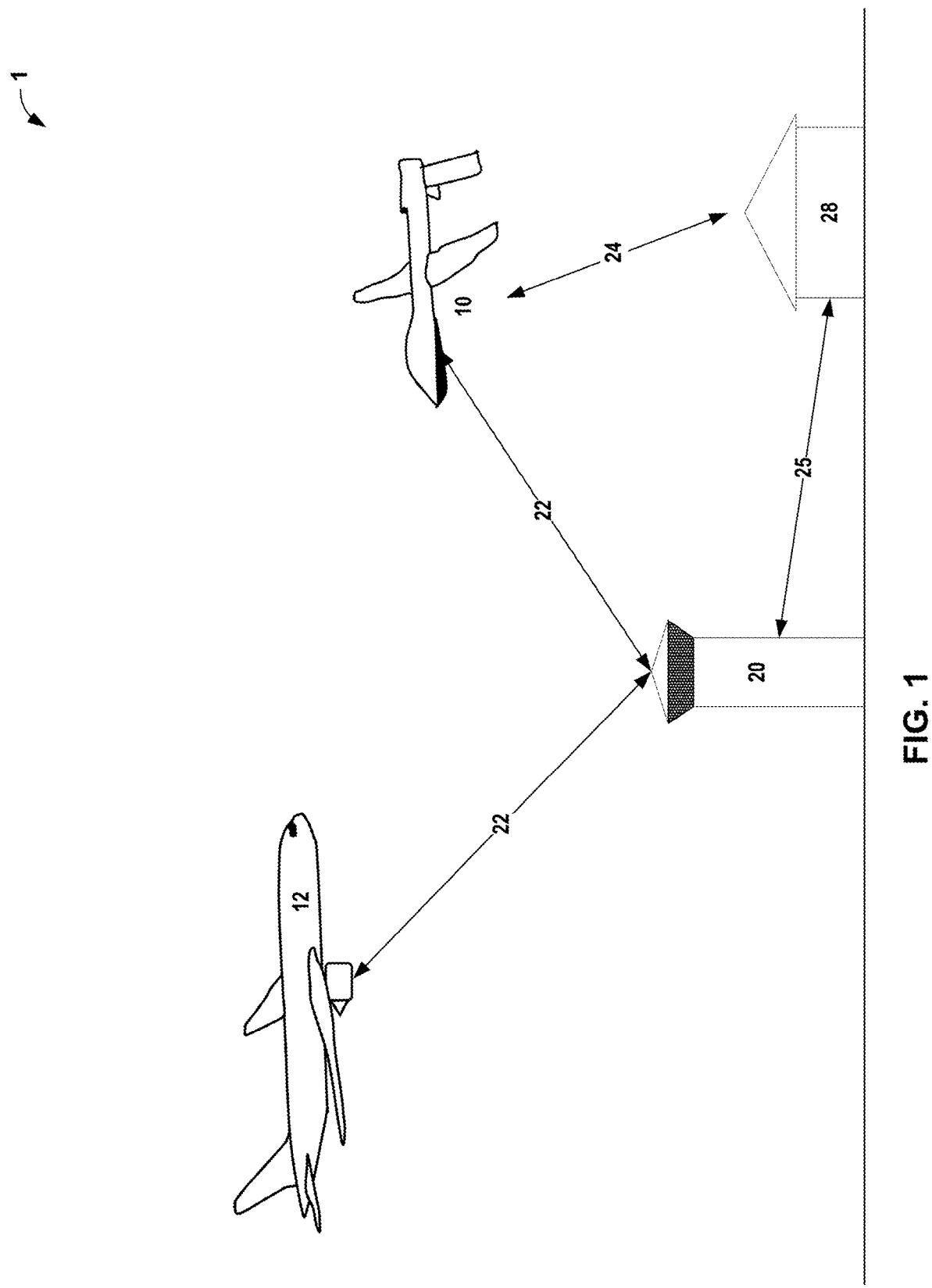
FIG. 1 is an illustration of an example implementation of a system in which workload assessment and annunciation may provide assistance to an aircrew.

The disclosure describes systems, which may be onboard an aircraft, that may objectively assess the current, or future workload of a pilot and automatically provide annunciation when needed to the pilot, as well as to resources that support the pilot. The system may automatically, and without pilot involvement, assess the workload for the pilot based on current and future events and abnormal scenarios, using predefined criteria. The system may process the inputs from various onboard systems and sensors to predict incoming events. The predicted incoming events may be related to normal operation data, such as navigation information, weather, traffic avoidance, and so on. The system may also detect possible abnormal scenarios, such as engine warnings, fuel or other system issues, and so on. The system may determine whether the predicted incoming events or the abnormal scenario satisfies one or more criteria. Based on the event satisfying one or more criteria, the system may output an annunciation to either the pilot, resources that support the pilot, or both. For example, the system may detect impending weather that may require two pilots be managing the flight of the aircraft. The system may notify the pilot actively flying the aircraft of an impending weather event. The system may also notify an onboard off-duty pilot that the off-duty pilot should return to the flight deck. In other examples, the system may also notify air traffic control (ATC), based on the workload assessment from the sensed data satisfying specified criteria. The system may perform the functions described above for both manned aircraft with an onboard flight crew, as well as for a remote pilot of an unmanned aerial vehicle (UAV).

In many cases, accidents happen as a result of an unbroken chain of events, when events in the accident chain could have been controlled. When the sequence of events is positively altered, the accident chain and the connecting links that lead to an aircraft accident may be avoided. Aviation accidents may be the result of many different factors including weather, mechanical issues, air crew experience, judgement, or other such factors. At any point leading to an accident, a problem link is broken by a sound decision, the accident may be prevented. Information from the FAA Risk Management Handbook indicate that a large percentage of aviation accidents have human factors as the primary cause. Anyone may break the link to a sequence of events leading up to the accident, which may include the flight crew, airline operations personnel, air traffic control, and so on. This disclosure describes systems and techniques, that when included on a vehicle, such as an aircraft, may help break one possible link in an accident chain by marshalling resources to assist an the vehicle operator, or operators under an increasing workload.

A successful pilot may possess the ability to concentrate, manage workloads, monitor, and perform several simultaneous tasks. Research has also demonstrated significant links between pilot personality and performance, particularly in the area of crew coordination and resource management. In contrast, some of the traits discovered in pilots prone to having accidents, as described by the FAA Risk Management Handbook may include a disdain toward rules, pilots who may fall into the personality category of "thrill and adventure seeking," those that tend toward impulsive rather than methodical and disciplined information gathering and, in the speed, and selection of actions taken. The systems and techniques of this disclosure are directed to countering a trait in some pilots that lead to a disregard for or underutilization of useful sources of information, including flight systems, copilots, flight attendants, flight service personnel, flight instructors, and air traffic controllers. In other words, some pilots may resist asking for help in certain situations when asking for help early may break the accident chain.

FIG. 1 is an illustration of an example implementation of a system in which workload assessment and annunciation may provide assistance to an aircrew. System 1 includes airborne systems, such as unmanned aerial system (UAV) 10 and manned aircraft, such as aircraft 12. In some examples, aircraft 12 may include large commercial aircraft that may be equipped with a suite of sensors, communication equipment, a flight management system (FMS), and other equipment. Some examples of airborne sensors that may be aboard aircraft 12, UAV 10 or other airborne platforms may include radar such as weather radar, ground avoidance radar, radar altimeter, and other active sensors. Passive sensors may include thermometer, pressure sensors, optical sensors such as cameras, including infrared cameras, and similar passive sensors. In some examples, aircraft may include automatic dependent surveillance-broadcast (ADS-B) interrogation and transponder capability (e.g., ADS-B-In and ADS-B-Out), which may provide weather, traffic and collision avoidance information. Aircraft 12 may communicate with air traffic control (ATC) 20 via voice radio or text-based systems such as a controller pilot data link communications (CPDLC) system. In other examples, aircraft 12 may include aircraft that are smaller and less well equipped such as general aviation aircraft, helicopters, airships and similar aircraft.

Unmanned aircraft, such as UAV 10 may include fixed and rotary wing UAV operated by a remote vehicle operator. In some examples UAV 10 may communicate with ground station 28 to receive commands and provide information, e.g., via communication link 24. In some examples, UAV 10 may communicate directly with ATC 20 via communication link 22. In other examples UAV 10 may send information and requests to ATC 20, as well as receive instructions from ATC 20 indirectly via communication link 25 through ground station 28. In some examples the remote vehicle operator may be present at ground station 28. In other examples, the remote vehicle operator may be at a different location but linked to ground station 28 via satellite, ground-based or other communication means. In this disclosure a remote vehicle operator may be described as a pilot actively in control of UAV 10. In some examples, a pilot, e.g., at a ground station may be in control of two or more unmanned aerial vehicles.

System 1 may include ground-based sensors included in ground station 28, ATC 20 or separate sensors not shown in FIG. 1. Some examples of ground-based sensors may include short and long range radar(s), optical sensors, direction finding and altitude sensing equipment, and weather sensors. Some examples of weather sensors include the Automated Weather Observing System (AWOS) and the Automated Surface Observing System (ASOS). Ground based sensors may also include ADS-B ground stations that receive and transmit information to and from aircraft such as UAV 10 and aircraft 12. Hazardous weather may include thunderstorms, clear air turbulence, low level wind shear, mountain waves, and other weather phenomena (not shown in FIG. 1).

For both manned aircraft and UAV a human operator or pilot may be required to be in the approval loop to execute maneuvers in compliance with see and avoid requirements in part 91.113 of the U.S. Code of Federal Regulations (14 CFR 91.113). UAV, such as UAV 10, are required to equip with a detect and avoid (DAA) system including an alerting and guidance algorithm that provides a range of safe maneuver options provided by the aircraft guidance system, that the UAV pilot selects from. While not required, manned aircraft may in some instances also include a DAA algorithm or similar system that provides a range of safe maneuver options to the pilot. For aircraft operating according to Instrument Flight Rules (IFR), the pilot must then coordinate the ATC clearance via VHF or UHF voice communications and execute that maneuver. For a manned aircraft, the pilot may execute the maneuver by operating the flight controls or selecting a maneuver to be executed by the aircraft guidance system. For UAV 10, the pilot in control of UAV 10 may command the UAV aircraft to execute the maneuver via the ground control station navigation interface.

Aircraft 12 or UAV 10 may include a system for assessing aircraft pilot workload, the system. The system may be implemented as processing circuitry operatively coupled to a memory which may be onboard aircraft 12 and UAV 10. In other examples, the functions of the system for assessing aircraft pilot workload may be distributed among processing circuitry located onboard the aircraft, at a ground station, e.g., ground station 28, with ATC 20, and so on. The processing circuitry of the system for assessing aircraft pilot workload may receive information regarding operational data related to the flight of the aircraft. Some examples of operational data may include based on signals from sensors on board the aircraft, such as weather radar, temperature sensors and other sensors described above.

Operational data may include navigation information such as course, heading, altitude, terrain, geographical location, e.g., from inertial navigation system, a global navigation satellite system (GNSS), i.e., a satellite constellation that provides positioning, navigation, and timing (PNT) services, such as the global positioning system (GPS). Operational data may also include weather information including predicted severe weather near the aircraft's planned flight path, which may be detected by onboard weather radar, as well as broadcast weather information from ADS-B, Sirius and other sources. The status of the aircraft, such as engine performance information, airspeed, fuel remaining, operating limitations, changes in cabin pressure may be considered operational data. The location of other nearby aircraft traffic may also impact the aircraft operation, e.g., may require one or more maneuvers to avoid other aircraft. Nearby traffic may be received by a variety of sources such as ADS-B and Traffic Information Service-Broadcast (TIS-B). ADS-B uses GPS satellites instead of ground-based radar to determine aircraft position. TIS-B takes the position and altitude of an air traffic control radar target, converts that information into a format that is compatible with ADS-B, and then broadcasts the information to aircraft equipped with an ADS-B datalink receiver.

Approach procedures and departure procedures to and from airports may also be considered operational data and may result in high workload for an aircrew when departing or arriving an airport. For example, airports in mountainous regions such as Salt Lake City, Utah, U.S.A., Zurich Switzerland, and Kangding China may have complex procedures involving many changes in heading, altitude and airspeed to avoid terrain, and remain clear of other aircraft to safely operate at these airports.

An abnormal scenario may also result in an increased workload for an aircrew. The processing circuitry of the system for assessing aircraft pilot workload may detect an abnormal scenario based on received information, e.g., from engine monitoring sensors, navigation equipment, weather information and so on. Some examples of abnormal scenarios may include an engine issue, including engine failure, fuel issue, flight control system issue, communication system issue, deviation from planned flight path, crewmember unable to perform duties, partial loss of flight instruments, in-flight fire or other similar issues.

The processing circuitry of system for assessing aircraft pilot workload may execute programming instructions to determine pilot workload based on the received information. The system may continue to monitor incoming information when the programming instructions analyze the incoming information and determine that the pilot workload is approximately the same or decreasing. In other examples, based on the incoming information, the processing circuitry of the system may determine that the pilot workload may increase the system may compare the determined pilot workload to a set of criteria. The system may determine which request of a set of requests to output based on the comparison. Some examples of the workload assessment and criteria may be seen in Table 1 below.

TABLE 1

Examples of Cockpit Workload Assessment

| Events Description | Classification | Annunciation Request |
|---|---|---|
| Long time X before arriving near terminal area. | Incoming Events Prediction | Preventive Reminding |
| Short time Y before arriving near a terminal area. (Y < X) | Incoming Events Prediction | Mandatory Cooperation |
| Deviation from planned route for short time Y | Abnormal Scenario Detection | Preventive Reminding |
| Deviation from planned route for long time X (Y < X) | Abnormal Scenario Detection | Mandatory Cooperation External Awareness |
| Engine failure | Abnormal Scenario Detection | Mandatory Cooperation External Awareness |

The set of requests that may be output by the pilot workload assessment system may include a preventive reminding request, a mandatory cooperation request; and an external awareness request. The processing circuitry may perform the assessment to determine the type of annunciation request based on the inputs described above and compare the assessment to a set of pre-defined the rules hosted in the system. In other words, the processing circuitry may compare the determined pilot workload to a set of criteria, for example, stored in programming instructions in a memory operably coupled to the processing circuitry. The processing circuitry may output one of the different annunciation requests based on the workload assessment as compared to the pre-defined criteria.

In some examples a preventive reminding may be generated to provide a reminder to the pilot actively in control of the aircraft before cockpit workload increases. As described above, the "cockpit workload" is a term that may also apply to a pilot for an unmanned aerial system, even though the pilot may be working at a remote control station for the unmanned aircraft rather than in a cockpit, also called a flight deck, of a manned aircraft. Similarly, "cockpit workload" may apply to vehicle operators for automobiles, on the bridge of a ship, the control station for a train and other similar situations. In other examples, the processing circuitry may output a mandatory cooperation request to provide an alert that the cockpit workload may increase shortly or has already increased. In other examples, the processing circuitry may output an external awareness request to provide a notification to ATC when external assistance is needed to relieve the cockpit workload. In some examples an external awareness request may also be sent to other locations, in addition to ATC. For example, the processing circuitry may automatically notify flight operations center personnel for an airline depending on the nature of the workload, the type of event, the immediacy of the needed action and other similar pre-defined rules.

The processing circuitry may automatically select a notification message based on the determined request of the set of requests and the determined workload. The processing circuitry may also determine a notification message channel over which to send the notification message, based on the pre-defined criteria in the programming instructions. For example, the processing circuitry may receive weather information e.g., from weather radar, satellite weather, pilot weather reports and so on that indicate unexpected turbulence in the flight path of the aircraft. If the unexpected turbulence is some distance ahead, e.g., twenty or more minutes, the processing circuitry may, based on the pre-defined criteria, determine a preventive reminding request should be output. The programming instructions may cause processing circuitry to select a notification message channel of a visual indicator on the multi-function display (MFD) and cause the MFD to output the notification message.

In examples in which unexpected weather conditions are more severe, and/or more imminent, e.g., only five or ten minutes ahead, the pre-defined rules in the programming instructions may cause the processing circuitry to select a different notification message channel. For example, the processing circuitry may still determine a preventive reminding request is appropriate but may select an audio notification as the notification message channel. In other examples, the processing circuitry may determine the severe weather fits the criteria for a mandatory cooperation request. The notification message channel may also include an announcing system to an off-duty pilot. For example, the notification message may be a series of tones over the announcing system to alert the off-duty pilot, but not alarm any passengers.

The system of this disclosure may provide advantages of other types of workload monitoring systems. Some examples of systems to detect pilot workload mainly focus on monitoring a pilot's biometric status to evaluate their capability for operation. These types of systems depend on data collected by biometric sensors, e.g., cameras, headsets that measure biometric signals and so on. These other systems require additional hardware to monitor the health state of the pilot flying, which can raise the complexity, cost and weight of such systems. Additionally, such systems are confined to monitor the pilot's biometric signals and health state, and therefore only respond when the pilot's stress level, and biometric signals, begin to elevate.

In contrast, the system of this disclosure may automatically assess the workload for the pilot actively in control of the aircraft in cockpit based on current and future events and abnormal scenarios. The system of this disclosure may then provide annunciation to the pilot in control, onboard off-duty pilot, and/or ATC on the ground based on workload assessment. In contrast to other types of workload assessment systems, the system of this disclosure may reduce or eliminate the effects of human factor risks from the pilot's hazardous attitudes. In other words, the system of this disclosure may minimize the improper judgments caused by hazardous attitude of the pilot in control especially under high workload.

Because the system of this disclosure may automatically detect and assess pilot workload, then automatically determine the type of request, notification message channel and notification message, the system may provide support to break an accident chain rather than being subject a decision of a destressed pilot in control to ask for support. As described above, the processing circuitry of the system may output the notification message outputs in different ways, over different notification message channels, which may include display/audio in cockpit, speaker in onboard lounge and datalink/communication with ATC.

With the improvement of avionics, the onboard systems have been extended to provide more autonomous functions to relief the crew workload. In some examples, transport airlines have been trying to reduce the number of onboard crew, especially for those long route flight that in the past may have used four or even more pilots onboard. This system of this disclosure may provide an opportunity for two pilots works in optimized collaboration which potentially release resources while maintain the safety of flight.

For long term interests, the concept of a reduced crew, such as a single pilot operation is expected to be achievable both in transport airplane and urban air mobility (UAM). In some examples hazardous attitudes may increase likelihood of human factor errors especially when single pilot flies under high workload without help. As transportation moves toward single pilot operations, it may be desirable to support single pilot operation to fly safely. The system of this disclosure may remind and help such single pilot operations proactively with available resources when necessary.

Figure 2:
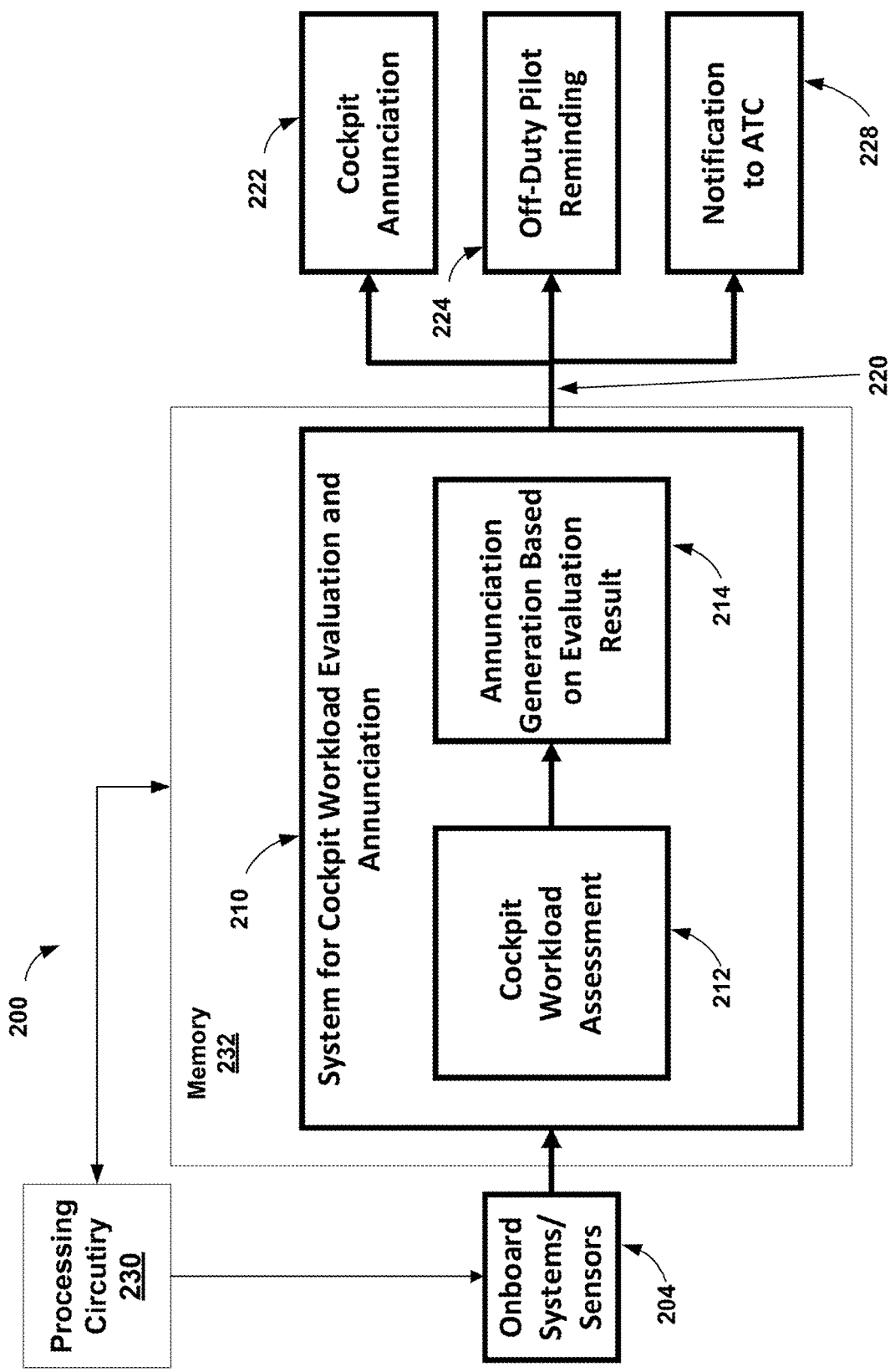
FIG. 2 is a block diagram illustrating an example system for cockpit workload assessment and annunciation according to one or more techniques of this disclosure.

FIG. 2 is a block diagram illustrating an example system for cockpit workload assessment and annunciation according to one or more techniques of this disclosure. System 200 is an example of a system that may be implemented on board aircraft 12 and for UAV 10 described above in relation to FIG. 1. In some examples, processing circuitry 230 and memory 232 implementing one or more portions of system 200 may be located, for example in UAV 10 as well as in ground station 28. The description of system 200 will focus on an implementation in a manned aircraft, such as aircraft 12, to simplify the description. In the example of FIG. 2, system 200 includes onboard systems and sensors 204, a system for cockpit workload evaluation and annunciation 210 (workload system 210, for short), notification message channels 220 configured for a preventive reminding request, via cockpit annunciation channel 222, a mandatory cooperation request via off-duty pilot reminding 224 and an external awareness request via notification to ATC channel 228.

Onboard systems and sensors 204 may include any of cockpit displays, flight controls, flight management systems (FMS), weather radar systems, integrated flight decks, autopilot systems, control display units and so on that may be located on board aircraft 12. Each system may have one or more processors that operate the system. For example, a weather radar system may have processing circuitry (not shown in FIG. 2) that controls the operation and processing the signals from the weather radar. The weather radar processing circuitry may communicate with other processing circuitry, e.g., located in a multi-function display, an integrated flight deck and so on. Other onboard systems may include the traffic collision avoidance system, which provides traffic situational information, ground proximity warning system to provide terrain awareness, wind shear warning systems and so on. Onboard systems and sensors 204 may provide data and information to workload system 210.

Examples of processor that executes programming instructions to implement system 200 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

Processing circuitry 230 of system 200 may be operatively coupled to a memory 232, which may store programming instructions, data, look-up tables, and so on. Examples of memory may include any type of computer-readable storage media. include random access memory (RAM), read only memory (ROM), programmable read only memory (PROM), erasable programmable read only memory (EPROM), one-time programable (OTP) memory, electronically erasable programmable read only memory (EEPROM), flash memory, or another type of volatile or non-volatile memory device. In some examples the computer readable storage media may store instructions that cause the processing circuitry to execute the functions described herein. In some examples, the computer readable storage media may store data, such as configuration information, temporary values and other types of data used to perform the functions of this disclosure.

Workload system 210 may be implemented in several different ways, depending on the aircraft and mission of the aircraft. In some examples, processing circuitry 230 and memory 232 may implement workload system 210 as a self-contained unit. Such a self-contained implementation of workload system 210 may include connections and wiring to connect to onboard systems 204, and notification message channels 220. In other examples, workload system 210 may be implemented as software and be executed by processing circuitry 230 may be already part of onboard systems 204, e.g., processing circuitry of an integrated flight deck, a flight management system and so on. In other words, a computer readable storage medium 232 operatively coupled to processing circuitry 232 on board an aircraft may store programming instructions to execute the functions described herein for system 200. In other examples, workload system 210 may be loaded into a stand-alone computing device, such as a laptop, tablet computer, electronic flight bag (EFB), etc. (not shown in FIG. 2). Workload system 210 may connect with onboard systems and sensors 204 through a wired or wireless connection. Workload system 210 may use a display of the stand-alone computing device as well as other notification message channels to deliver notifications as needed and described above. As noted above, in other examples, functions of system 200 may be executed by several different processors, e.g., one or more processors on board an aircraft, such as UAV 10, as well as one or more off-board processors, e.g., at a ground station, airborne support station, and so on.

As described above in relation to FIG. 1, workload system 210 may receive information from vehicle sensors, including weather radar, equipment status, navigation information and so on and from data sources outside the aircraft such as weather information and air traffic information. Cockpit workload assessment 212 may apply programming instructions to the received information, which may determine whether the cockpit workload is likely to increase, stay the same or decrease. Processing circuitry executing cockpit workload assessment 212 may classify future workload changes based on an incoming event prediction or abnormal scenario detection, as described above in relation to FIG. 1.

Processing circuitry executing the annunciation generation based on the evaluation result 214 may compare the determined pilot workload to a set of pre-defined rules, also described as pre-defined criteria in this disclosure. As described above in relation to FIG. 1, some of the pre-defined rules may include a predicted duration between a detection time of a possible change in workload, and an expected time of the possible change in workload. Other criteria may be related to a severity and likelihood of the risk associated with analysis of the incoming data. The processing circuitry executing workload system 210 may determine which request of the set of requests to output based on the comparison to the pre-defined rules. As described above in relation to FIG. 1, the set of requests may include a preventive reminding request, a mandatory cooperation request, and an external awareness request. The processing circuitry may select a notification message and a notification channel 220, then cause the notification message channel to output the notification message.

In some examples, workload system 210 may be configurable based on a variety of factors including the aircraft, the aircraft mission, aircraft capabilities, crew size and experience and so on. In some examples the predicted duration may be configurable based on the aircraft speed, aircraft location, amount of air traffic or other factors. For example, a faster airplane may have a shorter duration threshold between a preventive reminding request and a mandatory cooperation request than a slower airplane. In some examples, an airline that incorporates workload system 210 into their aircraft may have a standard configuration for all aircraft of the same type. In other examples, the airline may adjust the configuration based on the type of mission, e.g., a regional passenger trip, a multi-crew overseas passenger trip, a cargo mission and so on. In other examples, the airline may also adjust the configuration based on the experience level of the flight crew, whether the flight crew is a single pilot, reduced crew, or more than one pilot and so on. In other examples, the configuration may be based on the type of vehicle and the number of crew members available on board, and what remote support is available for a particular situation.

As described above in relation to FIG. 1, in some examples, the cockpit annunciation 222 for a preventive reminding request may be audible, such as a warning tone, a sequence of tones, spoken word or words similar to a traffic collision avoidance system (TCAS) traffic advisory (TA) and resolution advisory (RA) and so on. The cockpit annunciation may also be visual, such as an indicator light, a message on a screen such as the primary flight display (PFD), multi-function display and so on.

In some examples, the notification message channel for the cockpit annunciation 222 may also include haptic or other tactile feedback for a pilot, e.g., a vibration pattern in the control stick. Some modern aircraft may employ a fly-by-wire system. A fly-by-wire system may have no physical connection between the control surfaces and the control device. The control device, e.g., a control stick, rudder pedals, throttle and mixture controls, and so on, may act as an interface for the pilot to provide inputs to the flight control computers which then command the control surfaces with hydraulic actuators. With fly-by-wire systems, the physical link between the control device and control surfaces is lost and the pilot may have no feedback on the force applied to the flight control surfaces, e.g., ailerons, rudder, elevators, and so on. In fly-by-wire systems, sensors register the control device state, and using electrical wires the pilot's intent is communicated to the computer. Therefore, the information on the flight envelope protection system is not transferred to the pilot using the sense of touch. However, such systems may offer an opportunity to provide a notification channel that includes a haptic notification message to get the pilot's attention. The control device may include a vibration, or other type of device that may provide a notification, e.g., in the form of a vibration pattern, a resistance to control force or some other tactile indication to the pilot as well as vibration in the seat of airplane, armrest movement and so on that may not require a fly-by-wire system.

In some examples, the mandatory cooperation request may be delivered through a selected notification channel 220 to an off-duty pilot 224, who may not be currently in the cockpit. In some examples, for a single pilot flight, workload system 210 may skip the off-duty pilot reminding 224 and instead may notify ATC 228 with an external awareness request, based on the received information, workload assessment 212 and comparison to the pre-defined rules. In other examples, workload system 210 may notify a pilot, or other resources that may not be on the aircraft. As described above in relation to table 1, the pre-defined rules executed by processing circuitry of workload system 210 may determine that a mandatory cooperation request and/or an external awareness request may apply to the received information and predicted workload. Workload system 210 may contact a pilot, mechanic, air operations center personnel and so on as needed depending on the determined workload situation to provide support to the pilot actively in control of the aircraft.

Figure 3:
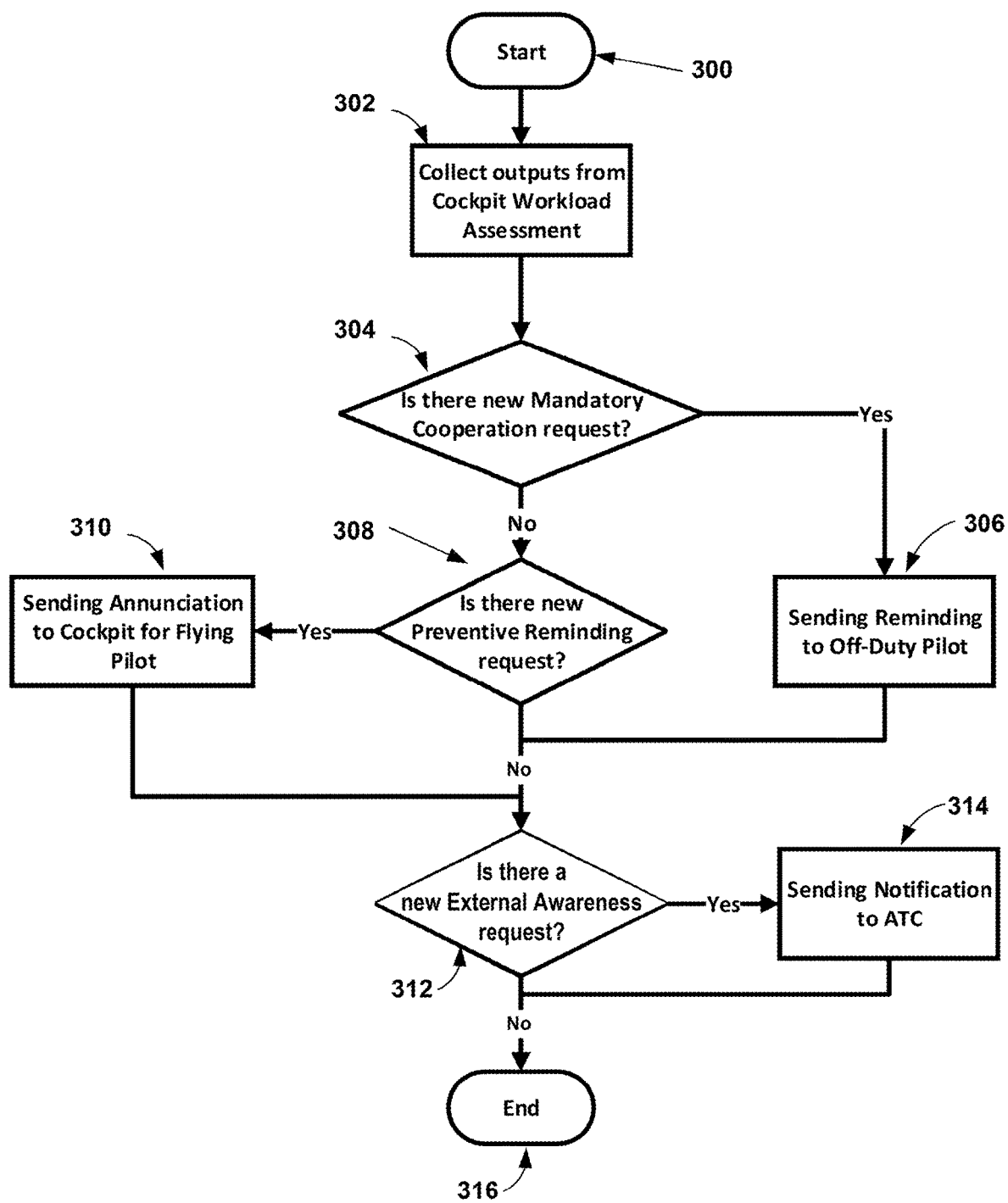
FIG. 3 is a flow chart illustrating an example operation of system for cockpit workload assessment and annunciation, according to one or more techniques of this disclosure.

FIG. 3 is a flow chart illustrating an example operation of system for cockpit workload assessment and annunciation, according to one or more techniques of this disclosure. The example of FIG. 3 describes in more detail the annunciation generation based on the evaluation result 214 function described above in relation to FIG. 2. In some examples, the functions described by FIG. 3 may engage automatically and run continually when the cockpit operates in a resource-reduced or single pilot mode. In some examples, the number of pilots in the cockpit may be determined in various ways like pressure of pilot seats or other sensing circuitry.

Workload system 210, depicted in FIG. 2 may be installed on an aircraft, like aircraft 12 and UAV 10 depicted in FIG. 1. Workload system 210 may start by receiving information from aircraft sensors, such as engine monitoring sensors, navigation systems as well as other sources (300). In other words, processing circuitry executing instructions for workload system 210 may receive information regarding operational data related to the flight of an aircraft operated by a pilot. Workload system 210 may also receive information to detect an abnormal scenario, e.g., unusual engine operation, unexpected changes in cabin pressure, unexpected severe weather, deviations from a flight path and so on.

The processing circuitry executing the cockpit workload assessment 212 features, as described above in relation to FIG. 2, may determine the pilot workload based on the received information. The annunciation generation 214 programming instructions may cause the processing circuitry to collect the outputs from the cockpit workload assessment (302). The processing circuitry may collect the annunciation request and send the corresponding command to the downstream systems to perform the annunciation based on comparing the determined pilot workload to a set of criteria. The processing circuitry may determine which request of a set of requests to output based on the comparison to the set of criteria.

The processing circuitry may check if there is mandatory cooperation request (304). When there is a mandatory cooperation request, (YES branch of 304), the processing circuitry for aircraft 12 may send a notification message over a selected notification message channel to an onboard off-duty pilot, for example to return to cockpit ASAP. In the example in which there is a mandatory cooperation request, the processing circuitry may bypass the preventive reminding (308) check. Bypassing the preventive reminding may be desirable assuming the cockpit will have full crew shortly. As described above in relation to FIG. 2, the mandatory reporting check (304) may be customized depending on whether off-duty pilot is available on onboard, which may not be applicable to those single pilot vehicles like urban air mobility or smaller airplane.

When there is no pending mandatory cooperation request, based on the pre-defined rules (NO branch of 304), the processing circuitry may check if there is a preventive reminding request (308). When there is a preventive reminding request, (YES branch of 308), the processing circuitry may send the annunciation to the pilot actively in control of the aircraft (310). In some examples, the annunciation may be a notification message and may include information regarding incoming events to for pilot in control to prepare to react to the events. As described above in relation to FIGS. 1 and 2, the notification channel may depend on the message. In some examples the preventive reminding notification message channel may include visual, audible or haptic feedback. In some examples the haptic feedback may be used to gain the pilot's attention and direct the pilot to a visual indication.

The processing circuitry may check for an external awareness request (312) after checking for the preventive reminding request (NO branch of 308) as well as after sending a preventive reminding request to the cockpit (310). When there is an external awareness request (YES branch of 312), the processing circuitry may send the notification to ATC (314) with status of the aircraft to request ground support. In some examples the notification message channel may include a text-based channel, or an automatically generated voice notification using radio. When there is no external request (NO branch of 312) or after sending a notification to ATC (314), the processing circuitry executing workload system 210 may end the current cycle (316) and continue to monitor information received from the information sources described above (300).

The techniques of this disclosure may also be described by the following examples:

Example 1: A system for assessing a pilot workload for an aircraft includes a memory; and processing circuitry operatively coupled to the memory and configured to: receive information regarding operational data related to a flight of the aircraft; determine the pilot workload based on the received information; compare the determined pilot workload to a set of criteria; determine which request of a set of requests to output based on the comparison, wherein the set of requests includes: a preventive reminding request; a mandatory cooperation request; and an external awareness request; select a notification message based on: the determined request of the set of requests and the determined workload, wherein the notification message includes a notification message channel; and cause the notification message channel to output the notification message.

Example 2: The system of example 1, wherein the information regarding the operational data is based on signals from sensors on board the aircraft.

Example 3: The system of example 2, wherein the operational data of the aircraft comprises one or more of: navigation information including course, heading, altitude, terrain, approach procedures and departure procedures, weather information including predicted severe weather near a planned flight path for the aircraft, engine performance information, fuel remaining, operating limitations, cabin pressure and other nearby aircraft traffic.

Example 4: The system of any of examples 1 through 3, wherein the processing circuitry is further configured to determine the pilot workload based on detecting an abnormal scenario.

Example 5: The system of example 4, wherein an abnormal scenario comprises any one or more of the following: an engine issue, including engine failure, fuel issue, flight control system issue, communication system issue, deviation from a planned flight path, partial loss of flight instruments, or in-flight fire.

Example 6: The system of any of examples 1 through 5, wherein the processing circuitry is further configured to determine which request of the set of requests based on: a predicted duration between a detection time of a possible change in workload, and an expected time of the possible change in workload, and the predicted duration is configurable.

Example 7: The system of any of examples 1 through 6, wherein the system engages automatically when the system detects the aircraft is operating with a reduced crew.

Example 8: The system of any of examples 1 through 7, wherein the notification message channel: for a preventive reminding request comprises to output the notification message to a pilot actively in control of the aircraft, wherein the notification message comprise audio, visual or tactile; a mandatory cooperation request comprises to output the notification message to an off-duty pilot; and an external awareness request comprises to output the notification message to air traffic control.

Example 9: A non-transitory computer-readable storage medium storing instructions that, when executed, cause one or more processors of a computing device to: determine a pilot workload of an aircraft pilot, wherein to determine the pilot workload, the instructions cause the one or more processors to: receive information regarding operational data related to a flight of the aircraft; determine pilot workload based on the received information; compare the determined pilot workload to a set of criteria; determine which request of a set of requests to output based on the comparison to the set of criteria, wherein the set of requests includes: a preventive reminding request; a mandatory cooperation request; and an external awareness request; select a notification message based on: the determined request of the set of requests and the determined workload, wherein the notification message includes a notification message channel; and cause the notification message channel to output the notification message.

Example 10: The non-transitory computer-readable storage medium of example 9, wherein the operational data of the aircraft comprises and one or more of: navigation information including course, heading, altitude, terrain, approach procedures and departure procedures, weather information including predicted severe weather near a planned flight path for the aircraft, engine performance information, fuel remaining, operating limitations, cabin pressure and other nearby aircraft traffic.

Example 11: The non-transitory computer-readable storage medium of any of examples 9 and 10, further comprising instructions for causing a programmable processor to determine the pilot workload based on detecting an abnormal scenario.

Example 12: The non-transitory computer-readable storage medium of example 11, wherein an abnormal scenario comprises any one or more of the following: an engine issue, including engine failure, fuel issue, flight control system issue, communication system issue, deviation from a planned flight path, partial loss of flight instruments, or in-flight fire.

Example 13: The non-transitory computer-readable storage medium of any of examples 9 through 12, wherein the processing circuitry is further configured to determine which request of the set of requests based on: a predicted duration between a detection time of a possible change in workload, and an expected time of the possible change in workload, and the predicted duration is configurable.

Example 14: The non-transitory computer-readable storage medium of any of examples 9 through 13, wherein the notification message channel: for a preventive reminding request comprises to output the notification message to a pilot actively in control of the aircraft, wherein the notification message comprise audio, visual or tactile; for a mandatory cooperation request comprises to output the notification message to an off-duty pilot; and for an external awareness request comprises to output the notification message to air traffic control.

Example 15: A method for assessing aircraft pilot workload includes receiving, by processing circuitry operatively coupled to a memory, information regarding operational data related to a flight of an aircraft operated by the pilot; determining, by the processing circuitry, the pilot workload based on the received information; comparing the determined pilot workload to a set of criteria; determining which request of a set of requests to output based on the comparison to the set of criteria, wherein the set of requests includes: a preventive reminding request; a mandatory cooperation request; and an external awareness request; selecting a notification message based on: the determined request of the set of requests and the determined workload, wherein the notification message includes a notification message channel; and causing the notification message channel to output the notification message.

Example 16: The method of example 15, wherein the operational data of the aircraft comprises and one or more of: navigation information including course, heading, altitude, terrain, approach procedures and departure procedures, weather information including predicted severe weather near a planned flight path for the aircraft, engine performance information, fuel remaining, operating limitations, cabin pressure and other nearby aircraft traffic.

Example 17: The method of any of examples 15 and 16, wherein the method further comprises determining the pilot workload based on detecting an abnormal scenario, wherein an abnormal scenario comprises any one or more of the following: an engine issue, including engine failure, fuel issue, flight control system issue, communication system issue, deviation from planned flight path, partial loss of flight instruments, or in-flight fire.

Example 18: The method of any of examples 15 through 17, further includes determining, by the processing circuitry, which request of the set of requests based on: a predicted duration between a detection time of a possible change in workload, and an expected time of the possible change in workload, and the predicted duration is configurable.

Example 19: The method of any of examples 15 through 18, wherein the notification message channel: for a preventive reminding request comprises a first notification message channel directed to outputting the notification message to a pilot actively in control of the aircraft, wherein the notification message comprise audio, visual or tactile; for a mandatory cooperation request comprises a second notification message channel directed to outputting the notification message to an off-duty pilot; and for an external awareness request comprises a third notification message channel directed to outputting the notification message to air traffic control.

In one or more examples, the functions described above may be implemented in hardware, software, firmware, or any combination thereof. For example, the various components of FIGS. 1 and 2, may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as for the components of FIG. 2, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware. Various examples of the disclosure have been described. These and other examples are within the scope of the following claims.

What is claimed is:

1. A system for assessing a future pilot workload for a pilot of an aircraft, the system comprising:
 a memory; and
 processing circuitry operatively coupled to the memory and configured to:
  receive information regarding operational data related to a flight of the aircraft, wherein the information comprises signals from sensors that measure at least a location of the aircraft in relation to terrain from a navigation system, weather predicted to affect the aircraft, operational status of aircraft systems including engine performance, and air traffic near the aircraft;
  based on the information received from the sensors, determine future events affecting the aircraft;
  determine the future pilot workload based on the determined future events affecting the aircraft;
  determine that the future pilot workload comprises an increase to cockpit workload;
  determine a time until the increase to the cockpit workload;
  determine which request of a set of requests to output based on the time until the increase to the cockpit workload, wherein to determine which request of the set of requests the processing circuitry is further configured to:
   select a preventive reminding request to provide a reminder to the pilot actively in control of the aircraft before the cockpit workload increases in response to the time until the increase to the cockpit workload being greater than a first threshold;
   select a mandatory cooperation request to provide an alert that the cockpit workload is expected to increase in response to the time until the increase to the cockpit workload being less than a second threshold, wherein the second threshold is less than the first threshold, and
   select an external awareness request to provide a notification to air traffic control (ATC) when external assistance is needed to relieve the cockpit workload in response to the time until the increase to the cockpit workload being less than a third threshold, wherein the third threshold is less than the first threshold;

determine a notification message based on the selected request of the set of requests and the determined future pilot workload; and cause a notification message channel to output the notification message.

2. The system of claim 1, wherein the information regarding the operational data is based on signals from sensors on board the aircraft.

3. The system of claim 2, wherein the operational data of the aircraft comprises one or more of:

navigation information including course, heading, altitude, terrain, approach procedures and departure procedures, weather information including predicted severe weather near a planned flight path for the aircraft, engine performance information, fuel remaining, operating limitations, cabin pressure and other nearby aircraft traffic.

4. The system of claim 1, wherein the processing circuitry is further configured to determine the future pilot workload based on detecting an abnormal scenario.

5. The system of claim 4, wherein an abnormal scenario comprises any one or more of the following: an engine issue, including engine failure, fuel issue, flight control system issue, communication system issue, deviation from a planned flight path, partial loss of flight instruments, or in-flight fire.

6. The system of claim 1, wherein the system engages automatically when the system detects the aircraft is operating with a reduced crew.

7. The system of claim 1, wherein the notification message channel:

for a preventive reminding request comprises to output the notification message to a pilot actively in control of the aircraft, wherein the notification message comprise audio, visual or tactile.

8. A non-transitory computer-readable storage medium storing instructions that, when executed, cause one or more processors of a computing device to:

determine a future pilot workload of an aircraft pilot, wherein to determine the pilot workload, the instructions cause the one or more processors to:

receive information regarding operational data related to a flight of the aircraft, wherein the information comprises signals from sensors configured to measure at least a location of the aircraft in relation to terrain from a navigation system, weather predicted to affect the aircraft, operational status of aircraft systems including engine performance, and air traffic near the aircraft;

based on the information received from the sensors, determine future events affecting the aircraft;

determine the future pilot workload based on the determined future events affecting the aircraft;

determine that the future pilot workload comprises an increase to cockpit workload;

determine a time until the increase to the cockpit workload;

determine which request of a set of requests to output based on the time until the increase to the cockpit workload, wherein to determine which request of the set of requests the instructions cause the one or more processors to:

select a preventive reminding request to provide a reminder to the pilot actively in control of the aircraft before the cockpit workload increases in response to the time until the increase to the cockpit workload being greater than a first threshold;

select a mandatory cooperation request to provide an alert that the cockpit workload is expected to increase in response to the time until the increase to the cockpit workload being less than a second threshold, wherein the second threshold is less than the first threshold, and select an external awareness request to provide a notification to air traffic control (ATC) when external assistance is needed to relieve the cockpit workload in response to the time until the increase to the cockpit workload being less than a third threshold, wherein the third threshold is less than the first threshold;

determine a notification message based on the selected request of the set of requests and the determined future pilot workload; and cause a notification message channel to output the notification message.

9. The non-transitory computer-readable storage medium of claim 8, wherein the operational data of the aircraft comprises one or more of: navigation information including course, heading, altitude, terrain, approach procedures and departure procedures, weather information including predicted severe weather near a planned flight path for the aircraft, engine performance information, fuel remaining, operating limitations, cabin pressure and other nearby aircraft traffic.

10. The non-transitory computer-readable storage medium of claim 8, further comprising instructions for causing a programmable processor to determine the future pilot workload based on detecting an abnormal scenario.

11. The non-transitory computer-readable storage medium of claim 10, wherein an abnormal scenario comprises any one or more of the following: an engine issue, including engine failure, fuel issue, flight control system issue, communication system issue, deviation from a planned flight path, partial loss of flight instruments, or in-flight fire.

12. The non-transitory computer-readable storage medium of claim 8, wherein the notification message channel:

for a preventive reminding request comprises to output the notification message to a pilot actively in control of the aircraft, wherein the notification message comprise audio, visual or tactile.

13. A method for assessing future pilot workload for a pilot of an aircraft, the method comprising:

receiving, by processing circuitry operatively coupled to a memory, information regarding operational data related to a flight of an aircraft operated by the pilot, wherein the information comprises signals sensors configured to measure at lease a location of the aircraft in relation to terrain from a navigation system, weather predicted to affect the aircraft, operational status of aircraft systems including engine performance, and air traffic near the aircraft;

determining, by the processing circuitry and based on the information received from the sensors, future events affecting the aircraft;

determining, by the processing circuitry and based on the determined future events, the future pilot workload;

determining that the future pilot workload comprises an increase to cockpit workload;

determining a time until the increase to the cockpit workload;

determining which request of a set of requests to output based on the time until the increase to the cockpit workload, wherein to determine which request of the set of requests the processing circuitry is further configured to:

selecting a preventive reminding request to provide a reminder to the pilot actively in control of the aircraft before the cockpit workload increases in response to the time until the increase to the cockpit workload being greater than a first threshold;

selecting a mandatory cooperation request to provide an alert that the cockpit workload is expected to increase in response to the time until the increase to the cockpit workload being less than a second threshold, wherein the second threshold is less than the first threshold, and selecting an external awareness request to provide a notification to air traffic control (ATC) when external assistance is needed to relieve the cockpit workload in response to the time until the increase to the cockpit workload being less than a third threshold, wherein the third threshold is less than the first threshold;

the set of requests and the determined future pilot workload; and causing a notification message channel to output the notification message.

14. The method of claim 13, wherein the operational data of the aircraft comprises and one or more of: navigation information including course, heading, altitude, terrain, approach procedures and departure procedures, weather information including predicted severe weather near a planned flight path for the aircraft, engine performance information, fuel remaining, operating limitations, cabin pressure and other nearby aircraft traffic.

15. The method of claim 13, wherein the method further comprises determining the future pilot workload based on detecting an abnormal scenario, wherein an abnormal scenario comprises any one or more of the following: an engine issue, including engine failure, fuel issue, flight control system issue, communication system issue, deviation from planned flight path, partial loss of flight instruments, or in-flight fire.

16. The method of claim 13, wherein the notification message channel:

for a preventive reminding request comprises a first notification message channel directed to outputting the notification message to a pilot actively in control of the aircraft, wherein the notification message comprise audio, visual or tactile;

for a mandatory cooperation request comprises a second notification message channel directed to outputting the notification message to an off-duty pilot; and for an external awareness request comprises a third notification message channel directed to outputting the notification message to air traffic control.

* * * * *